United States Patent [19]

Ballweber et al.

[11] 3,979,348

[45] Sept. 7, 1976

[54] IONIC POLYMERS FROM ACRYLAMIDE LATEX POLYMERS

[75] Inventors: Edward G. Ballweber, Glenwood; Kenneth G. Phillips, River Forest, both of Ill.

[73] Assignee: Nalco Chemical Company, Oak Brook, Ill.

[22] Filed: Feb. 20, 1975

[21] Appl. No.: 551,467

Related U.S. Application Data

[63] Continuation-in-part of Ser. No. 479,941, June 17, 1974, abandoned, which is a continuation-in-part of Ser. No. 379,860, July 16, 1973, abandoned.

[52] U.S. Cl. ................ 260/29.4 UA; 260/29.6 SQ; 260/29.6 N
[51] Int. Cl.² ........................................ C08L 61/20
[58] Field of Search ............ 260/29.4 UA, 67 S, 72, 260/851, 29.6 Z, 29.6 SQ, 29.6 N

[56] References Cited
UNITED STATES PATENTS

| | | | |
|---|---|---|---|
| 3,435,009 | 3/1969 | Sellet | 260/851 |
| 3,539,535 | 11/1970 | Wisner | 260/72 |
| 3,624,019 | 11/1971 | Anderson et al. | 260/29.6 H |
| 3,734,873 | 5/1973 | Anderson et al. | 260/29.6 H |
| 3,790,529 | 2/1974 | Fujimura et al. | 260/29.4 UA |

Primary Examiner—Lorenzo B. Hayes
Attorney, Agent, or Firm—John G. Premo; Robert A. Miller; Barry W. Sufrin

[57] ABSTRACT

A process for preparing both cationic and anionic acrylamide polymers through the reaction of a formaldehyde-secondary amine or formaldehyde-sulfurous acid adduct with a water-in-oil emulsion of finely divided acrylamide polymer. The resulting products are further characterized in that they can be inverted easily into aqueous solution. Compositions produced by the invention are also disclosed.

12 Claims, No Drawings

IONIC POLYMERS FROM ACRYLAMIDE LATEX POLYMERS

This is a continuation-in-part of our copending application Ser. No. 479,941 filed June 17, 1974 now abandoned which is in turn a continuation-in-part of our application Ser. No. 379,860 filed July 16, 1973 which is now abandoned.

This invention relates to a new and improved method for preparing water-soluble cationic and anionic acrylamide polymers by reacting a formaldehyde adduct with a water-in-oil emulsion which contains dispersed therein a finely divided acrylamide polymer. The formaldehyde adduct is prepared by reacting formaldehyde with a secondary amine or sulfurous acid and its water-soluble salts. When the formaldehyde-secondary amine adduct is reacted with the emulsion-containing polymer, the resulting product is a water-in-oil emulsion of a finely divided cationic acrylamide polymer. When the adduct of formaldehyde and a compound selected from sulfurous acid and its water-soluble salts is reacted with the polymer emulsion, a water-in-oil emulsion of a finely divided anionic acrylamide polymer is formed.

U.S. Pat. No. 2,761,834 teaches the reaction of an acrylamide compound with formaldehyde and then reacting with sulfurous acid to form a water-soluble anionically modified polyacrylamide.

U.S. Pat. No. 2,328,901 teaches the reaction of a secondary amine with formaldehyde and then the reacting of the adduct so formed with a water-soluble polymer acrylamide. These particular references teach the formation of a formaldehyde adduct which in turn is reacted with polyacrylamide.

There have been serious problems with these methods of prior art. Since the polyacrylamide is in an aqueous solution, the concentration of products obtained by these methods must be limited by the viscosity of the polymer. In order to eliminate this factor of low concentration, work has also been done on the preparation of solid cationic and anionically modified polymers of acrylamide. However, by the use of a solid polymer, the end-user is faced with extremely long times needed to solibilize these products.

The method of this invention involves an improved method for preparing water-soluble cationic and anionic acrylamide polymers. The method of this invention involves preparing the formaldehyde adduct and then reacting the adduct with a water-in-oil emulsion which contains dispersed therein a finely divided acrylamide polymer. The method of this invention provides to the art a new and improved method for preparing the polymers in a short period of time as well as providing a polymer with improved properties in high concentrations which can be inverted into aqueous solution in a matter of seconds. No precipitation or drying steps need be used in this invention. Also, no time-consuming dissolution step is necessary. Therefore, this invention provides to the art a more economical method of providing the anionically and cationically modified acrylamide polymers.

OBJECTS

It is therefore an object of this invention to provide an improved method for preparing water-soluble cationic and anionic polymers.

Another object of this invention is to provide a method for preparing water-soluble cationic and anionic polymers by reacting a formaldehyde adduct with a water-in-oil emulsion which contains dispersed therein a finely-divided water-soluble vinyl addition polymer.

A further object of this invention is to provide a method for preparing a water-soluble cationic polymer by preparing a formaldehyde secondary amine adduct and reacting the adduct with a water-in-oil emulsion which contains dispersed therein a finely divided water-soluble vinyl addition polymer.

D. A still further object of this invention is to provide a method for preparing a water-soluble anionic polymer by preparing an adduct of formaldehyde and a compound selected from sulfurous acid and its water-soluble salts and then reacting the adduct with a water-in-oil emulsion which contains dispersed therein a finely divided water-soluble vinyl addition polymer.

Other objects will appear hereinafter.

THE INVENTION

This invention involves a method for preparing water-soluble cationic and anionic polymers by preparing a formaldehyde adduct and reacting the adduct with a water-in-oil emulsion which contains dispersed therein a finely divided water-soluble acrylamide polymer.

THE WATER-IN-OIL EMULSION OF ACRYLAMIDE POLYMERS

The water-in-oil emulsions of finely divided acrylamide polymer useful in this invention are stable, yet at the same time contain relatively large amounts of polymer. The polymers dispersed in the emulsion are quite stable when the particle size of the polymer is in the range of 2 millimicrons up to about 5 microns. The preferred particle size is within the range of 5 millimicrons and 3 microns.

The stable water-in-oil emulsion comprises: 1. an aqueous phase; 2. a hydrophobic liquid; and 3. a water-in-oil emulsion emulsifying agent.

The polymer containing emulsion of this invention is comprised of an aqueous phase ranging from between 30 and 95 percent by weight of the emulsion. The aqueous phase is defined as the sum of the polymer or copolymer and the water present in the composition. The preferred range is between 70 and 90 percent by weight of the emulsion. The most preferred range is between 70 and 80 percent by weight of the emulsion.

The polymer concentration of the emulsion ranges between 10 – 50 percent by weight. A preferred range is between 25 and 40 percent by weight of the emulsion. The most preferred range is between 25 and 35 percent by weight of the emulsion.

As seen, based on the weight of the aqueous phase and the percent polymer contained in the aqueous phase, the polymer containing emulsion may contain from 25–85% by weight water.

For the purposes of this invention, the term, acrylamide polymer, includes a acrylamide homopolymers and copolymers which contain at least 20 percent and preferably 75 percent by weight of acrylamide. The acrylamide polymers most commonly used in the practice of this invention include polyacrylamide and its water-soluble copolymers prepared by polymerizing acrylamide with monomers such as for instance, acrylic acid, methylacrylic acid, itaconic acid, acrylonitrile, dimethylaminomethylmethacrylate. An acrylamide polymer also useful in the practice of this invention is hydrolized polyacrylamide which has from 1 – 50 percent of the original carboxamide groups hydrolized carboxyl groups. The molecular weights of such polymers and copolymers exceeds 500,000.

The molecular weight of the acrylamide polymers described above may vary over a wide range, e.g., 10,000 to 25 million. The preferred acrylamide polymer has a molecular weight in excess of one million.

The organic or oil phase of the emulsion is comprised of an inert hydrophobic liquid. The hydrophobic liquid comprises between 5 to 70 percent by weight of the emulsion. The preferred range is between 5 and 40 percent by weight of the emulsion. The most preferred range is between 20 and 30 percent by weight of the emulsion.

The oils used in preparing these emulsions may be selected from a large group of organic liquids which include liquid hydrocarbons and substituted liquid hydrocarbons. A preferred group of organic liquids are aliphatic hydrocarbon liquids which include blends of aromatic and aliphatic hydrocarbon compounds, which contain from 4 to 8 carbon atoms. Thus, such organic hydrocarbon liquids as benzene, xylene, toluene, mineral oils, kerosenes, naphtha and in certain instances, petroleum, may be used. A particularly useful oil from the standpoint of its physical and chemical properties is the branch-chain isoparaffinic solvent sold by Humble Oil and Refinery Company under the trade name "Isopar M". Typical specifications of this narrow-cut isoparaffinic solvent are set forth below in TABLE I.

TABLE I

| Specification Properties | Minimum | Maximum | Test Method |
| --- | --- | --- | --- |
| Gravity, API at 60/60 °F. | 48.0 | 51.0 | ASTM D 287 |
| Color, Saybolt | 30 | — | ASTM D 156 |
| Aniline point, °F. | 185 | — | ASTM D 611 |
| Sulfur, ppm | — | 10 | ASTM D 1266 (Nephelometric mod.) |
| Distillation, °F. | | | |
| IBP | 400 | 410 | |
| Dry point | — | 495 | |
| Flash point, °F. (Pensky-Martens closed cup) | 160 | — | ASTM D 93 |

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. The water-in-oil emulsifying agent is presented in amounts ranging between 0.1 and 21.0% by weight of the emulsion. The preferred range is between 1.0 and 15.0% by weight of the emulsion. The most preferred range is between 1.2 and 10% by weight of the emulsion. It is important that the emulsifying agent selected does not react with the formaldehyde or formaldehyde adduct.

The polymers contemplated for use in this invention maybe synthesized in emulsion form as described in Vanderhoff et al., U.S. 3,284,393 which is hereby incorporated by reference. The polymerization technique set forth in Vanderhoff is generally followed in preparing polymeric latexes used in this invention.

Also contemplated in the practice of this invention is the preparation of suitable water-in-oil emulsions of water-soluble polymers by the methods described in Anderson et al., U.S. Pat. No. 3,624,019 and U.S. Pat. No. 3,734,873, both of which are hereby incorporated by reference.

The water-in-oil emulsion used in the practice of this invention exhibits the unique ability of rapidly dissolving into aqueous solution. The polymer-containing emulsion releases the polymer in water in the presence of a surfactant in a very short period of time. This invention technique is described in Anderson et al, U.S. Pat. No. 3,624,019 and U.S. Pat. No. 3,734,873.

The Formaldehyde Adducts

This invention involves the formation of two different types of formaldehyde adducts, depending upon whether a cationic or anionic polymer is desired. To prepare a cationic polymer it is necessary to form a formaldehyde-secondary amine adduct. The formaldehyde-secondary amine adduct may be prepared by reacting an aqueous solution of formaldehyde with the secondary amine. This reaction may take place at ambient temperature or may be performed at elevated temperatures. However, the reaction proceeds at a rapid rate at ambient temperature. The molar ratio of formaldehyde to secondary amine may vary over a wide range but the preferred ratio is within the range of 10:1 to 1:10. The most preferred ratio of formaldehyde to secondary amine is 2:1 to 1:2. The formaldehyde adduct should be prepared in as concentrated a form as possible so as to minimize dilution effects on the end product. However, due to the concentrations of commercial aqueous solutions of formaldehyde, and of aqueous amines, the concentration is limited. Preferably, the concentration of the adduct should be between 0.1 to 55% by weight. The most preferred concentration of the adduct is from 25 to 55% by weight in aqueous solution.

The preferred secondary amine used to prepare the formaldehyde adducts of this invention is dimethylamine. However, other secondary amines, preferably those containing 3 to 8 carbon atoms and which include methylethylamine, morpholine, diethylamine, piperidine, diisopropylamine and dibutylamine can be used. The amines used can be aliphatic or cyclic, straight chained or branched.

To prepare an anionic polymer it is necessary to form the formaldehyde adduct by reacting an aqueous solution of formaldehyde and a compound selected from sulfurous acid and its water-soluble salts. It is preferred to use in most instances sulfurous acid salts of the alkali metals. Generally, the most preferred salts used are sodium bisulfite and potassium bisulfite. In addition to using the alkali metal salts in this invention, ammonium and tertiary amine salts of sulfurous acid such as ammonium bisulfite or trimethylamine sulfite may be used. The ratio of formaldehyde to sulfurous acid or its water-soluble salts may vary over a wide range but preferably is within the rage of 10:1 to 1:10. The most preferred molar ratio of formaldehyde to the compound selected from sulfurous acid and its water-soluble salt is 2:1 to 1:2. This type of adduct is generally made by adding together an aqueous solution of formaldehyde and sulfurous acid or its water-soluble salts.

THE METHOD

Once the formaldehyde adduct is prepared, it is added to the water-in-oil emulsion of a finely divided acrylamide polymer. The molar ratio of the formaldehyde adduct to the acrylamide polymer contained in the water-in-oil emulsion of the finely divided acrylamide polymer may vary from 10:.1 to .1:10, and preferably between 0.3:1 to 3.0:1. The most preferred mole ratio of formaldehyde adduct to the acrylamide polymer contained in the water-in-oil emulsion of finely divided acrylamide is 1:2 to 2:1.

Due to the volume of water present in the formaldehyde adduct solution, it is often advisable to add an amount of hydrophobic liquid, such as Isopar M, along with additional water-in-oil surfactants to keep the water-in-oil emulsion stable and fluid. The optimum amount of additional hydrophobic liquid to be added must be determined based on the water-in-oil emulsion containing the acrylamide polymer on an individual basis; however, it is often 25 to 75% by weight of the aqueous formaldehyde solution to be added. The additional water-in-oil emulsifier is added for stability purposes and also is determined on the basis of the acrylamide polymer emulsion being used, as well as the pH of operation and salt concentration. The additional emulsifier however is usually added in a 1 to 25% level on the amount of additional hydrophobic liquid added.

The reaction may be performed at ambient temperatures. However, the reaction may be heated to increase the reaction rate. The reaction is rapid, and is completed at ambient temperatures within approximately 60 minutes. When a formaldehyde-secondary amine adduct is used the reaction temperature should not exceed 170°F., and the minimum temperature should not be below 30°F. The preferred temperature range of this reaction is between 70° to 140°F.

When a formaldehyde adduct made from formaldehyde and sulfurous acid or its water-soluble salts is used, the reaction temperature should not exceed 212°F., and heating may be necessary for the reaction to proceed. The preferred temperature range of this reaction is between 70° to 190°F.

After allowing a sufficient period of time for the formaldehyde to react, a stable water-in-oil emulsion of a finely-divided ionically modified acrylamide polymer results. In the case where a formaldehyde-secondary amine has been added to the water-in-oil emulsion, a finely-divided cationically modified acrylamide polymer is formed which is stable over a reasonable amount of time. In the case where a formaldehyde adduct made from formaldehyde and sulfurous acid or its water-soluble salts is added to the acrylamide latex, a stable water-in-oil emulsion of a finely-divided anionically modified polymer results. In both cases, the pH of the reaction between the water-in-oil emulsion of finely-divided acrylamide polymer and the formaldehyde adduct should be greater than 7.

In the case of the stable water-in-oil of a finely-divided anionically modified acrylamide polymer above, it may be desirable to adjust the final pH of this emulsion to between 3 and 9 with an inorganic acid in order to stop possible hydrolysis of the acrylamide polymer after the reaction between the acrylamide and anionic formaldehyde adduct is complete.

To illustrate the invention the following Examples are presented:

EXAMPLE 1

| Acrylamide emulsion recipe: | |
|---|---|
| ISOPAR M | 27.60 grams |
| Sorbitan Monostearate | 1.65 grams |
| Water | 40.20 grams |
| Acrylamide | 36.51 grams |
| Sodium Hydroxide | 2.29 grams |
| 2,2'azobis (isobutyronitrile) | 0.07 grams |

The sorbitan monostearate was dissolved in the ISOPAR M and the resulting solution was poured into a two liter glass reactor fitted with a stirrer, thermometer, and nitrogen purge. The monomer solution was prepared by dissolving the acrylamide in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was headed to 60°C. with agitation. The reaction proceeded for 2½ hours at which time it had reached completion. The resulting product was a stable emulsion.

EXAMPLE 2

| Acrylamide-acrylic acid emulsion recipe: | |
|---|---|
| ISOPAR M | 28.10 grams |
| Sorbitan Monostearate | 1.85 grams |
| Water | 40.00 grams |
| Acrylamide | 33.90 grams |
| Acrylic Acid | 2.40 grams |
| Sodium Hydroxide | 2.30 grams |
| 2,2'azobis (isobutyronitrile) | 0.07 grams |

As in Example 1, the sorbitan monostearate was dissolved in the ISOPAR M and the resulting solution was poured into a two liter glass reactor fitted with stirrer, thermometer, and nitrogen purge. The monomer solution was prepared by dissolving the acrylamide and acrylic acid in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60°C. with agitation. The reaction proceeded for 2½ hours at which time it had reached completion. The resulting product was a stable emulsion:

EXAMPLE 3

| Acrylamide-methacrylic acid emulsion recipe: | |
|---|---|
| ISOPAR M | 27.60 grams |
| Sorbitan Monostearate | 1.65 grams |
| Water | 40.20 grams |
| Acrylamide | 34.51 grams |
| Methacrylic Acid | 2.31 grams |
| Sodium Hydroxide | 2.29 grams |
| 2,2'azobis (isobutyronitrile) | 0.07 grams |

The sorbitan monostearate was dissolved in the ISOPAR M and the resulting solution was poured into a two liter glass reactor fitted with a stirrer, thermometer, and nitrogen purge. The monomer solution was prepared by dissolving the acrylamide and methacrylic acid in water. The pH of the monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated to 60°C. with agitation. The reaction proceeded for 2½ hours at which time it had reached completion. The resulting product was a stable emulsion.

This invention is further illustrated by the following examples:

CATIONIC EXAMPLES

EXAMPLE 4

To a 500 ml flask was added 79.0 g of an aqueous 38% formaldehyde solution followed by 90.0 g of an aqueous 60% solution of dimethylamine. The mixture was agitated and kept at temperature below 104°F. for 10 minutes.

EXAMPLE 5

To 210.7 g of the emulsion in Example 1 was added 64.0 g of ISOPAR M and 7.7 g of Sorbitan Monooleate with agitation to produce a stable water-in-oil emulsion. 169.0 g of the aqueous formaldehyde-dimethylamine adduct prepared in Example 4 was then added to this emulsion with agitation at room temperature. The pH of the system was alkaline due to excess amine present in the formaldehyde adduct solution. The mixture was then heated at 113°F. for 1 hour with agitation to produce a stable water-in-oil emulsion of a finely divided cationically modified acrylamide polymer.

EXAMPLE 6

The procedure of Example 5 was followed with the latex emulsion of Example 3 being used instead of that of Example 1. A stable water-in-oil emulsion resulted.

EXAMPLES 7 – 16

The procedure of Examples 4 – 5 were combined with the ingredients in the following table. The ratio of "Isopar M" and sorbitan monooleate to the water-in-oil emulsion were kept at the same level of Example 5.

TABLE II

| Example No. | DMA[1] (gms) | $CH_2O$[2] (gms) | Latex | DMA-$CH_2O$ (gms) | Latex (gms) |
|---|---|---|---|---|---|
| 7 | 125 | 100 | Ex 3 | 100 | 100 |
| 8 | 150 | 100 | Ex 3 | 25 | 100 |
| 9 | 200 | 50 | Ex 3 | 50 | 100 |
| 10 | 300 | 30 | Ex 3 | 100 | 100 |
| 11 | 50 | 200 | Ex 3 | 100 | 25 |
| 12 | 30 | 300 | Ex 3 | 100 | 50 |
| 13 | 100 | 100 | Ex 2 | 100 | 100 |
| 14 | 200 | 50 | Ex 2 | 50 | 100 |
| 15 | 50 | 200 | Ex 2 | 100 | 50 |
| 16 | 50 | 300 | Ex 2 | 10 | 100 |

[1]Dimethylamine, 60% aqueous solution
[2]Formaldehyde, 38% aqueous solution

All resulted in stable emulsions

EXAMPLE 17

The polymers prepared above in Examples 6 to 9 were tested on a sewage sludge to determine their activity. A 7.7% solids sludge was treated with the polymer and a standard filter leaf test was run on the mixtures.

Of the many tests currently being used for cacuum filtration applications, probably the most quantitative test is the filter leaf. This test is used by Eimco and Komline Sanderson, two manufacturers of vacuum filters, to determine filter media selection as well as chemicals and dosage.

Since the filter leaf test requires nearly a quart of sludge per test, a large enough sample should be obtained so that the whole series of tests can be run from it. A solids determination should be run on the sample. This can be done either by using a moisture balance, or by taking a 25 or 50 g sample and drying at 105°C. for 3 hours. Once the approximate concentration has been determined, sample size and filter media should be selected. Usually, an 800 ml sample size is chosen. The filter media usually chosen is either Eimco Corporation NY-415 or POPR-859 or an equivalent.

When installing a new media on the filter leaf, it is important to seal the back of the leaf. It is also recommended that the first two or three tests with a new leaf be discarded. It is important to rinse the filter media well after each use.

The polymer solution for all tests in a series is diluted to 10% of the total sludge volume (i.e. for 800 ml of sludge, use 80 ml total dilution). For untreated "blank" samples, still add 10% dilution water. This dilution procedure will give typical results in most cases. To calculate polymer dosage, use the formula:

$$\text{ml dose} = \frac{(\text{lbs/Ton}) \times (\text{ml sludge}) \times (\% \text{ solids in sludge})}{(\% \text{ chemical solution}) \times (2000)}$$

where all percentages are expressed as decimals (i.e. 1% = .01).

To run the filter leaf test, pour 800 ml of sludge into a mixing vat, place under a gang stirrer with an oversize blade, and start the mixer. Add the polymer which has been diluted to 10% of the total sludge volume and mix for 30 seconds. Roll the leaf into the sludge and apply vacuum. A vacuum of 10 to 15 inches is used, being sure to keep the same vacuum for the complete test series. At the end of the submergence time (1 minute), slowly rotate the leaf out of the pan in an arc and place in a clamp with the sludge cake up. At the end of the drying time (2 minutes), break the vacuum, remove the cake from the leaf with a spatual and weigh. For most tests wet cake weights and filtrate volumes can be used to compare chemical effectiveness. In some cases, it may be necessary to then dry the cake and reweigh it to determine actual dry solids. This can be useful to determine which treatment will product the drier cake. The amount of filtrate from each test is measured and recorded.

| Polymer | Dosage (No./ton) | Filtrate (ml) |
|---|---|---|
| Ex 6 | 0.4 | 163 |
| Ex 6 | 0.8 | 203 |
| Ex 6 | 1.0 | 200 |
| Ex 8 | 0.4 | 186 |
| Ex 8 | 0.8 | 232 |
| Ex 8 | 1.0 | 246 |
| Ex 9 | 0.4 | 176 |
| Ex 9 | 0.8 | 217 |
| Ex 9 | 1.0 | 240 |

All polymers gave similar good results in dewatering the sewage sludge.

ANIONIC EXAMPLES

EXAMPLE 18

To a 500 ml flask was added 79.0 g of an aqueous 38% formaldehyde solution. To this was added a solution of 104.0 g of sodiumbisulfite in 104.0 g of water. An exothermic reaction resulted and the temperature was kept below 125°C. After approximately 10 minutes the reaction was complete.

EXAMPLE 19

To a 1 liter resin flask was added 210.7 g of the emulsion in Example 1 followed by 90.0 g of ISOPAR M and 7.7 g of Sorbitan Monooleate. After mixing to produce a uniform emulsion, 287.0 g of the formaldehyde-bisulfite adduct of Example 19 was added. The pH of the resulting emulsion was raised to 12.0 through the addition of a 50% NaOH solution. The alkaline emulsion was then heated for 4 hours at 125°F. and cooled. The resulting water-in-oil emulsion of a finely-divided anionic acrylamide polymer was stable.

EXAMPLE 20

To 100.0 g of the emulsion produced in Example 19 was added a quantity of a 30% sulfuric acid solution to adjust the pH of the emulsion to 7. A stable emulsion resulted.

EXAMPLE 21

15.0 g of the emulsion prepared in Example 19 was added to a 3000 ml stirred beaker. To this was added 2.0 liter of a synthetic seawater mixture and 1.0% of a water-soluble hydrophilic surfactant capable of inverting the polymer into an aqueous solution. Upon stirring, the solution thickened. Thus, the anionic modified acrylamide polymer of Example 20 is useful as a "pusher" compound in oil wells where a brine solution exists.

We claim:

1. A method for the preparation of a stable water in oil emulsion of finely divided, cationically modified acrylamide polymer which comprises the steps of:
   A. Preparing an aqueous solution of formaldehyde and a secondary amine containing 2 to 8 carbon atoms with the molar ratio of formaldehyde to secondary amine containing 2 to 8 carbon atoms being from 10:1 to 1:10; to provide a formaldehyde secondary amine adduct and,
   B. Adding the formaldehyde secondary amine adduct prepared in Step A to a water in oil emulsion of finely divided acrylamide polymer, said water in oil emulsion of a finely divided acrylamide polymer comprising in percentages by weight:
      a. 10 to 50% acrylamide polymer,
      b. 25 to 85% water,
      c. 5 to 40% of a hydrophobic liquid, and
      d. 0.1 to 21% of a water in oil emulsifying agent, said acrylamide polymer being characterized as having a molecular weight of from 10,000 to 25,000,000 and having a particle size of from 2 millimicrons up to about 5 microns, with the molar ratio of formaldehyde secondary amine adduct to acrylamide polymer of from 10:.1 to .1:10; and then,
   C. Mixing the formaldehyde secondary amine adduct and said water in oil emulsion of finely divided acrylamide polymer for a period of time sufficient to produce a stable water in oil emulsion of a finely divided cationically modified acrylamide polymer.

2. The process of claim 1 in which said formaldehyde secondary amine adduct is prepared by adding together an aqueous solution of dimethylamine and an aqueous solution of formaldehyde in molar ratios of from 1:2 to 2:1 so that the weight percent of said formaldehyde secondary amine adduct in aqueous solution is from 0.01 to 55%.

3. The process of claim 1 wherein said water in oil emulsion is finely divided acrylamide polymer contains from 20% to 50% by weight polymer and said formaldehyde secondary amine adduct is added to said water in oil emulsion of finely divided acrylamide polymer in a molar ratio of from 2:1 to 1:2.

4. The process of claim 1 wherein said formaldehyde secondary amine adduct is added to said water in oil emulsion of finely divided acrylamide polymer at temperatures of between 30° to 170°F.

5. The composition prepared by the process of claim 1.

6. A method for the preparation of a stable water in oil emulsion of a finely divided anionically modified acrylamide polymer which comprises the steps of:
   A. Preparing an aqueous solution of formaldehyde and a compound selected from sulfurous acid and its water-soluble salts with the molar ratio of formaldehyde to sulfurous acid being from 10:1 to 1:10; to prepare a formaldehyde sulfurous acid adduct and,
   B. Adding said formaldehyde sulfurous acid adduct prepared in Step A to a water in oil emulsion of finely divided acrylamide polymer, said water in oil emulsion of a finely divided acrylamide polymer comprising in percentages by weight:
      a. 10 to 50% acrylamide polymer,
      b. 25 to 85% water,
      c. 5 to 40% of a hydrophobic liquid, and
      d. 0.1 to 21% of a water in oil emulsifying agent, said acrylamide polymer being characterized as having a molecular weight of from 10,000 to 25,000,000 and having a particle size of from 2 millimicrons up to about 5 microns, with the molar ratio of formaldehyde sulfurous acid adduct to said acrylamide polymer of from 10:.1 to .1:10 and then,
   C. Mixing the formaldehyde sulfurous acid adduct and said water in oil emulsion of finely divided acrylamide polymer for a period of time sufficient to produce a stable water in oil emulsion of a finely divided anionically modified acrylamide polymer.

7. The process of claim 6 wherein said formaldehyde sulfurous acid adduct is added to said water in oil emulsion of finely divided acrylamide polymer in a molar ratio of from 2:1 to 1:2 at a pH greater than 7.

8. The process of claim 6 wherein said compound selected from sulfurous acid or its water-soluble salts is from the group consisting of sodium bisulfite and potassium bisulfite.

9. The process of claim 6 wherein said formaldehyde sulfurous acid adduct is added to said water in oil emulsion of finely divided acrylamide polymer at temperatures of from 70° to 212°F.

10. A method for the preparation of a stable water in oil emulsion of a finely divided anionically modified acrylamide polymer which comprises the steps of:
   A. Preparing an aqueous solution of formaldehyde and a compound selected from sulfurous acid and its water-soluble salts with the molar ratio of formaldehyde to sulfurous acid being from 10:1 to 1:10; to prepare a formaldehyde sulfurous acid adduct and, B. Adding said formaldehyde sulfurous acid adduct prepared in Step A to a water in oil emulsion of finely divided acrylamide polymer, said water in oil emulsion of a finely divided acrylamide polymer comprising in percentages by weight:
  a. 10 to 50% acrylamide polymer,
  b. 25 to 85% water,
  c. 5 to 40% of a hydrophobic liquid, and
  d. 0.1 to 21% of water in oil emulsifying agent said acrylamide polymer being characterized as having a molecular weight of from 10,000 to 25,000,000 and having a particle size of from 2 millimicrons up to about 5 microns, with the molar ratio of formaldehyde sulfurous acid adduct to said acrylamide polymer of from 10:.1 to .1:10; and, C. Mixing the formaldehyde sulfurous acid adduct and said water in oil emulsion of finely divided acrylamide polymer for a period of time sufficient to produce a stable water in oil emulsion of a finely divided anionically modified acrylamide polymer; and then, D. Adding an inorganic acid to said water and oil emulsion of a finely divided anionically modified acrylamide polymer, to a pH of between 3 to 9.

11. The composition prepared by the process of claim 6.

12. The composition prepared by the process of claim 10.

* * * * *